(12) United States Patent
Wu et al.

(10) Patent No.: US 10,047,870 B2
(45) Date of Patent: Aug. 14, 2018

(54) ONE WAY VALVE ASSEMBLY

(71) Applicant: Koge Micro Tech Co., Ltd., New Taipei (TW)

(72) Inventors: Chung-Han Wu, Taipei (TW); Yu-Chang Yen, New Taipei (TW)

(73) Assignee: Koge Micro Tech Co., Ltd., New Taipei (TW)

(*) Notice: Subject to any disclaimer, the term of this patent is extended or adjusted under 35 U.S.C. 154(b) by 95 days.

(21) Appl. No.: 15/271,193

(22) Filed: Sep. 20, 2016

(65) Prior Publication Data

US 2018/0023715 A1 Jan. 25, 2018

(30) Foreign Application Priority Data

Jul. 19, 2016 (TW) .............................. 105122784 A (51) Int. Cl.
*F16K 15/14* (2006.01)
*F04B 17/00* (2006.01)
(Continued)

(52) U.S. Cl.
CPC .......... *F16K 15/144* (2013.01); *F04B 17/003* (2013.01); *F16K 7/12* (2013.01);
(Continued)

(58) Field of Classification Search
CPC ...... F16K 15/144; F16K 27/0209; F16K 7/12; Y10T 137/7891; Y10T 137/7895; Y10T 137/7881
(Continued)

(56) References Cited

U.S. PATENT DOCUMENTS 3,084,707 A * 4/1963 Frye .................... F15B 13/04
137/102
3,633,605 A * 1/1972 Smith ..................... F15B 13/02
137/113
(Continued)

FOREIGN PATENT DOCUMENTS

CN 2435596 6/2001
JP 2009281530 12/2009
(Continued)

OTHER PUBLICATIONS

"Office Action of Taiwan Counterpart Application," dated Dec. 14, 2016, p. 1-p. 3, in which the listed references were cited.

*Primary Examiner* — R. K. Arundale
*Assistant Examiner* — Patrick Williams
(74) *Attorney, Agent, or Firm* — JCIPRNET (57) ABSTRACT

A one way valve assembly including a base, a cover, and a valve member is provided. The base includes a first and a second lower hollows and an inlet communicated with the first lower hollow. The cover includes a first and a second upper hollows, a connecting path, an outlet, and an exhaust nozzle. Positions of the first and the second upper hollows correspond to positions of the first and the second lower hollows. The first upper hollow is communicated with the second upper hollow via the connecting path. The outlet is communicated with the second upper hollow. The valve member is disposed between the base and the cover. The valve member has a first zone, a second zone, and a third zone corresponding to the first and the second upper hollows and the connecting path, and includes a valve nozzle between the second lower hollow and the second upper hollow. The first zone can deform towards the first lower hollow or the first upper hollow. The second zone can deform towards the second lower hollow or the second (Continued)

upper hollow. The third zone can deform towards the connecting path.

10 Claims, 10 Drawing Sheets (51) Int. Cl.
*F16K 7/12* (2006.01)
*F16K 27/02* (2006.01)
(52) U.S. Cl.
CPC ..... *F16K 27/0209* (2013.01); *Y10T 137/7881* (2015.04); *Y10T 137/7891* (2015.04)
(58) Field of Classification Search
USPC ........................................ 137/855, 859, 845
See application file for complete search history.

(56) References Cited

U.S. PATENT DOCUMENTS 5,176,658 A * 1/1993 Ranford ................ A61M 39/24
137/102
9,352,086 B2 5/2016 Guala

FOREIGN PATENT DOCUMENTS

| JP | 2016056902 | 4/2016 |
|----|------------|--------|
| TW | I4044878 | 8/2013 |
| TW | M533147 | 12/2016 |

* cited by examiner

ONE WAY VALVE ASSEMBLY

CROSS-REFERENCE TO RELATED APPLICATION

This application claims the priority benefit of Taiwan application serial no. 105122784, filed on Jul. 19, 2016. The entirety of the above-mentioned patent application is hereby incorporated by reference herein and made a part of this specification.

BACKGROUND OF THE INVENTION

Field of the Invention

The invention relates to a one way valve assembly, and particularly relates to a one way valve assembly having a good effect of anti-reverse.

Description of Related Art

Currently, designers often use a one way valve to make a fluid flow along a single direction, so as to avoid the situation that outflow efficiency of the fluid is low caused by different flow directions. However, how to design the one way valve that the fluid can flow only along the single direction when passing through, so as to achieve the effect of anti-reverse actually, is the scope that the skilled in the art eager to research.

SUMMARY OF THE INVENTION

The invention provides a one way valve assembly, which can make a fluid move along a single direction and have a good outflow efficiency.

The invention provides a one way valve assembly including a base, a cover, and a valve member. The base includes a base inner surface, a first lower hollow and a second lower hollow which are recessed at the base inner surface, and an inlet communicated with the first lower hollow. The cover includes a cover inner surface, a first upper hollow, a second upper hollow and a connecting path which are recessed at the cover inner surface, an outlet, and an exhaust nozzle located in the first upper hollow. Positions of the first upper hollow and the second upper hollow respectively correspond to positions of the first lower hollow and the second lower hollow. The first upper hollow is communicated with the second upper hollow via the connecting path. The outlet is communicated with the second upper hollow. The valve member is disposed between the base and the cover. The valve member has a first zone, a second zone, and a third zone corresponding to the first upper hollow, the second upper hollow, and the connecting path, and includes a valve nozzle located between the second lower hollow and the second upper hollow. The first zone is suitable to deform towards the first lower hollow or the first upper hollow. The second zone is suitable to deform towards the second lower hollow and the second upper hollow. The third zone is suitable to deform towards the connecting path. In an initial state, the valve member is suitable to seal the first lower hollow and the second lower hollow. After a gas enters the first lower hollow from the inlet, the first zone of the valve member is pushed by the gas to deform towards the first upper hollow so as to abut against the exhaust nozzle, then the third zone of the valve member is pushed by the gas to deform towards the connecting path, and then the second zone of the valve member is pushed by the gas to deform towards the second upper hollow sequentially. The gas flows from the first lower hollow through the second lower hollow, the valve nozzle, and the second upper hollow sequentially, and then is exhausted from the outlet. In an exhaust state, the valve member is recovered to close a connected state between the first lower hollow and the second lower hollow and a connected state between the second lower hollow and the second upper hollow. The first zone of the valve member is recovered to open an exhaust nozzle through hole. The gas located between the cover and the valve member leaves from the one way valve assembly from the exhaust nozzle automatically.

According to an embodiment of the invention, a width of a connection between the connecting path and the second upper hollow is Wo. A maximum width of the first upper hollow is D. $0.03 \leq Wo/D \leq 1$.

According to an embodiment of the invention, a width of a connection between the connecting path and the first upper hollow is Wi. A width of a connection between the connecting path and the second upper hollow is Wo. $Wi \geq Wo$.

According to an embodiment of the invention, a width of the connecting path is gradually decreased or unchanged from a connection between the connecting path and the first upper hollow to a connection between the connecting path and the second upper hollow.

According to an embodiment of the invention, the valve nozzle is located at the second zone of the valve member and protruded towards the second lower hollow. A depth of the second upper hollow is larger than a protrusion height of the valve nozzle, and the protrusion height of the valve nozzle is larger than a depth of the second lower hollow.

According to an embodiment of the invention, the cover further includes a groove recessed at the second upper hollow. The groove is communicated with the outlet.

According to an embodiment of the invention, the inlet and the outlet extend along the same direction or different directions.

According to an embodiment of the invention, the valve nozzle and the outlet are collinear or non-collinear.

According to an embodiment of the invention, the cover is fixed to the base in an airtight manner.

Based on the above, the designs of the one way valve assembly of the invention are that, the positions of the first upper hollow and the second upper hollow of the cover respectively correspond to the positions of the first lower hollow and the second lower hollow of the base, the valve member is disposed between the base and the cover, the first zone, the second zone, and the third zone of the valve member are suitable to deform towards the first upper hollow, the second upper hollow, and the connecting path respectively, the exhaust nozzle is located in the first upper hollow, and the valve nozzle of the second zone abuts against a bottom surface of the second lower hollow. Thus, after the gas entering the first lower hollow from the inlet and accumulated to a certain pressure, the first zone of the valve member is pushed to deform towards the first upper hollow first so as to abut against the exhaust nozzle. Then, the third zone of the valve member is pushed to deform towards the connecting path. Thereafter, the second zone of the valve member is pushed, such that the valve nozzle leaves from the bottom surface of the second lower hollow. The gas flows through the second lower hollow, the valve nozzle, and the second upper hollow sequentially, and then is exhausted from the outlet. In other words, in the process that the gas flows from the first lower hollow to the second lower hollow, the first zone of the valve member will deform to abut against the exhaust nozzle. Additionally, when the gas is accumulated to enough pressure, the third zone of the valve member can deform. Then, the gas flows to the second lower hollow to ensure again that the first zone will abut against the exhaust nozzle tightly, so as to avoid gas exhaust of the exhaust nozzle in the outgassing process thereafter. Similarly, in the process that the gas flows from the second lower hollow to the second upper hollow, enough pressure is also needed to make the second zone of the valve member deform. Thus, the third zone and the second zone of the valve member can achieve the effect similar to a double-valve member. The deformation of the third zone can be used to ensure again that the exhaust nozzle will be forced tightly by the first zone and make the gas flow from the first lower hollow to the second lower hollow. The deformation of the second zone can make the gas flow from the second lower hollow to the second upper hollow. Additionally, after the inlet stops air intake, the valve member will be recovered. The recovered second zone can prevent the gas from flowing from the second upper hollow back to the second lower hollow, and the recovered third zone can prevent the gas from flowing from the second lower hollow back to the first lower hollow, so as to achieve the effect of double anti-reverse. Also, the recovered first zone can make the exhaust nozzle through hole open, and the gas located between the cover and the valve member can be exhausted via the exhaust nozzle automatically.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
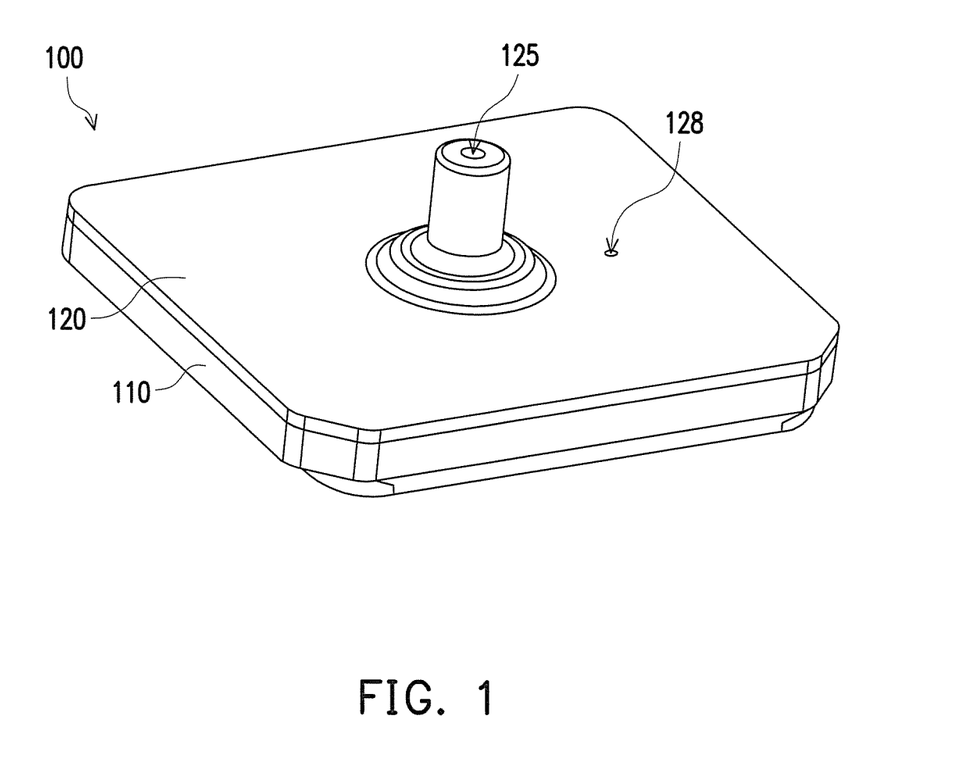
FIG. 1 is a schematic three-dimensional view of a one way valve assembly according to an embodiment of the invention.

FIG. 1 is a schematic three-dimensional view of a one way valve assembly according to an embodiment of the invention. Referring to FIG. 1, a one way valve assembly 100 of the embodiment may be connected to a pump (e.g., a piezoelectric pump or a bump having the effect of gas exhaust, not shown). The fluid output from the bump after entering the one way valve assembly 100 may move and output along a single direction. The one way valve assembly 100 has a good ability to anti-reverse and can provide a good outflow efficiency for the fluid. It will be described in detail in the following.

Figure 2:
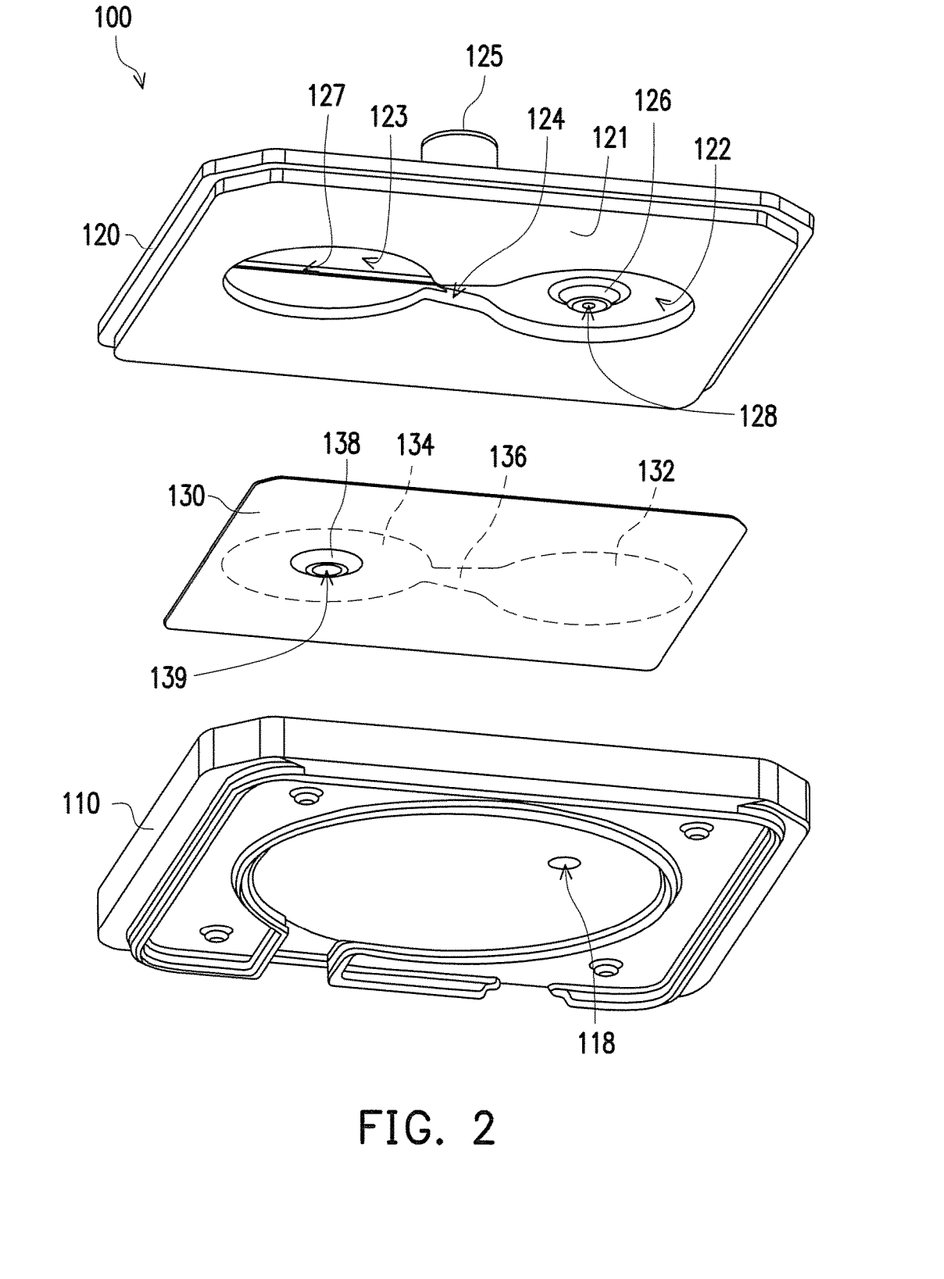
FIG. 2 and FIG. 3 are schematic exploded views of the one way valve assembly from different viewing angles of FIG. 1.
Figure 3:
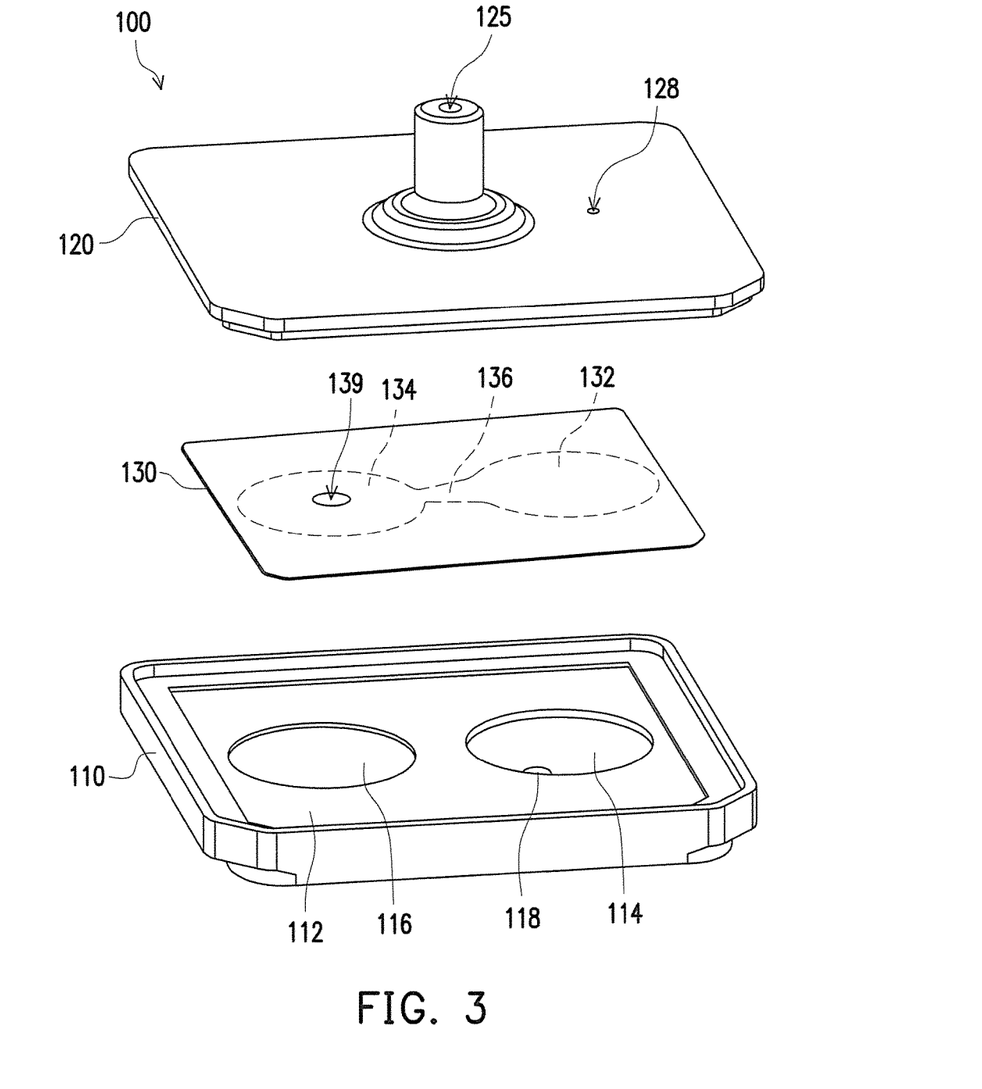
Figure 4:
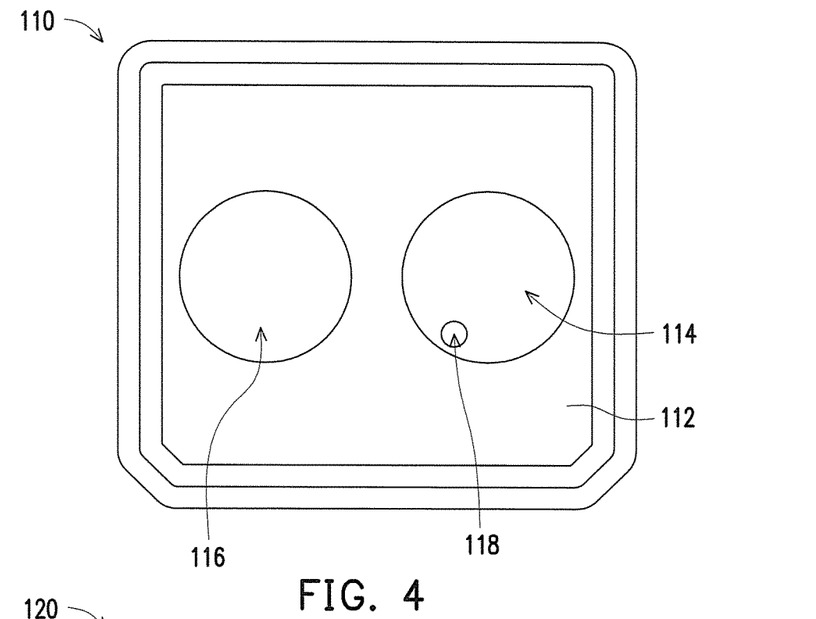
FIG. 4 and FIG. 5 are schematic views of a base and a cover of the one way valve assembly of FIG. 1 respectively.
Figure 5:
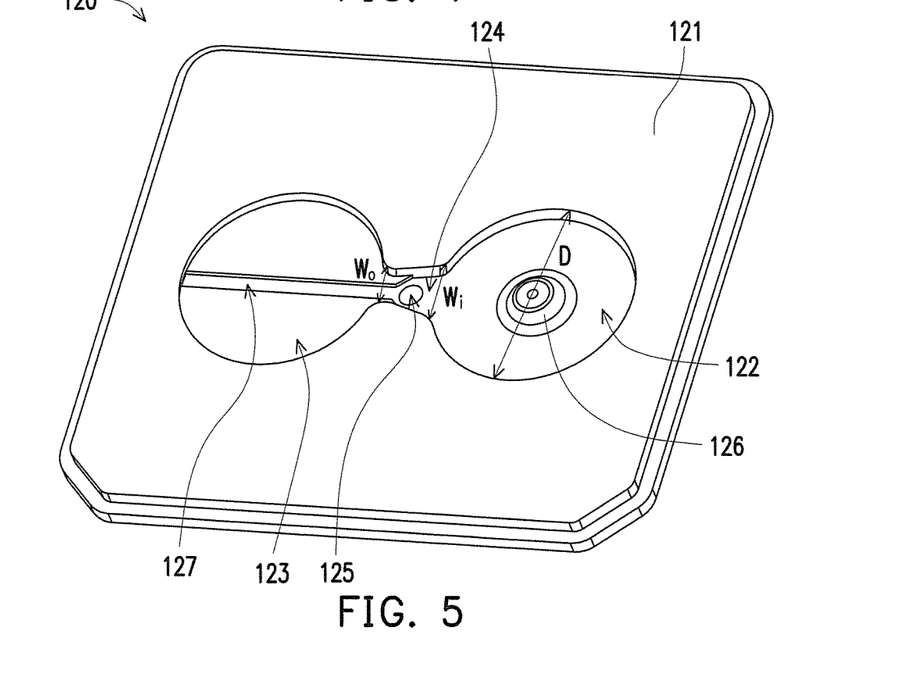

FIG. 2 and FIG. 3 are schematic exploded views of the one way valve assembly from different viewing angles of FIG. 1. FIG. 4 and FIG. 5 are schematic views of a base and a cover of the one way valve assembly of FIG. 1 respectively. Referring to FIG. 1 to FIG. 5, the one way valve assembly 100 of the embodiment includes a base 110, a cover 120, and a valve member 130 disposed between the base 110 and the cover 120. As shown in FIG. 2 and FIG. 4, the base 110 includes a base inner surface 112, a first lower hollow 114 recessed at the base inner surface 112 and a second lower hollow 116 recessed at the base inner surface 112, and an inlet 118 communicated with the first lower hollow 114. In the embodiment, the inlet 118 of the base 110 is a single inlet penetrating the base 110 and communicated with the first lower hollow 114.

As shown in FIG. 3 and FIG. 5, the cover 120 includes a cover inner surface 121, a first upper hollow 122, a second upper hollow 123, a connecting path 124, an exhaust nozzle 126, and an outlet 125. The first upper hollow 122, the second upper hollow 123, and the connecting path 124 are recessed at the cover inner surface 121 respectively. In the embodiment, positions of the first upper hollow 122 and the second upper hollow 123 of the cover 120 respectively correspond to positions of the first lower hollow 114 and the second lower hollow 116 of the base 110. The connecting path 124 is located between the first upper hollow 122 and the second upper hollow 123, and the first upper hollow 122 is communicated with the second upper hollow 123 via the connecting path 124. In the embodiment, the outlet 125 is located at the position near the center of the cover 120, where is the position near the connecting path 124, and the outlet 125 is communicated with the second upper hollow 123. The exhaust nozzle 126 is located in the first upper hollow 122 and protruded from a top surface of the first upper hollow 122 toward downward. The exhaust nozzle 126 has an exhaust nozzle through hole 128 penetrating the cover 120.

In the embodiment, a material of the valve member 130 is flexible, such as a rubber, a silicon member, or a polymer compound. The valve member 130 has a first zone 132, a second zone 134, and a third zone 136 corresponding to the first upper hollow 122, the second upper hollow 123, and the connecting path 124, and includes a valve nozzle 138 located between the second lower hollow 116 and the second upper hollow 123. In the embodiment, since the first lower hollow 114 of the base 110 and the first upper hollow 122 of the cover 120 are respectively located below and above the first zone 132 of the valve member 130, the first lower hollow 114 of the base 110 and the first upper hollow 122 of the cover 120 provide a space for the first zone 132 of the valve member 130 to deform. That is, the first zone 132 of the valve member 130 can deform towards the first lower hollow 114 or the first upper hollow 122. Similarly, the second zone 134 of the valve member 130 is suitable to deform towards the second lower hollow 116 or the second upper hollow 123, and the third zone 136 of the valve member 130 is suitable to deform towards the connecting path 124.

Figure 6:
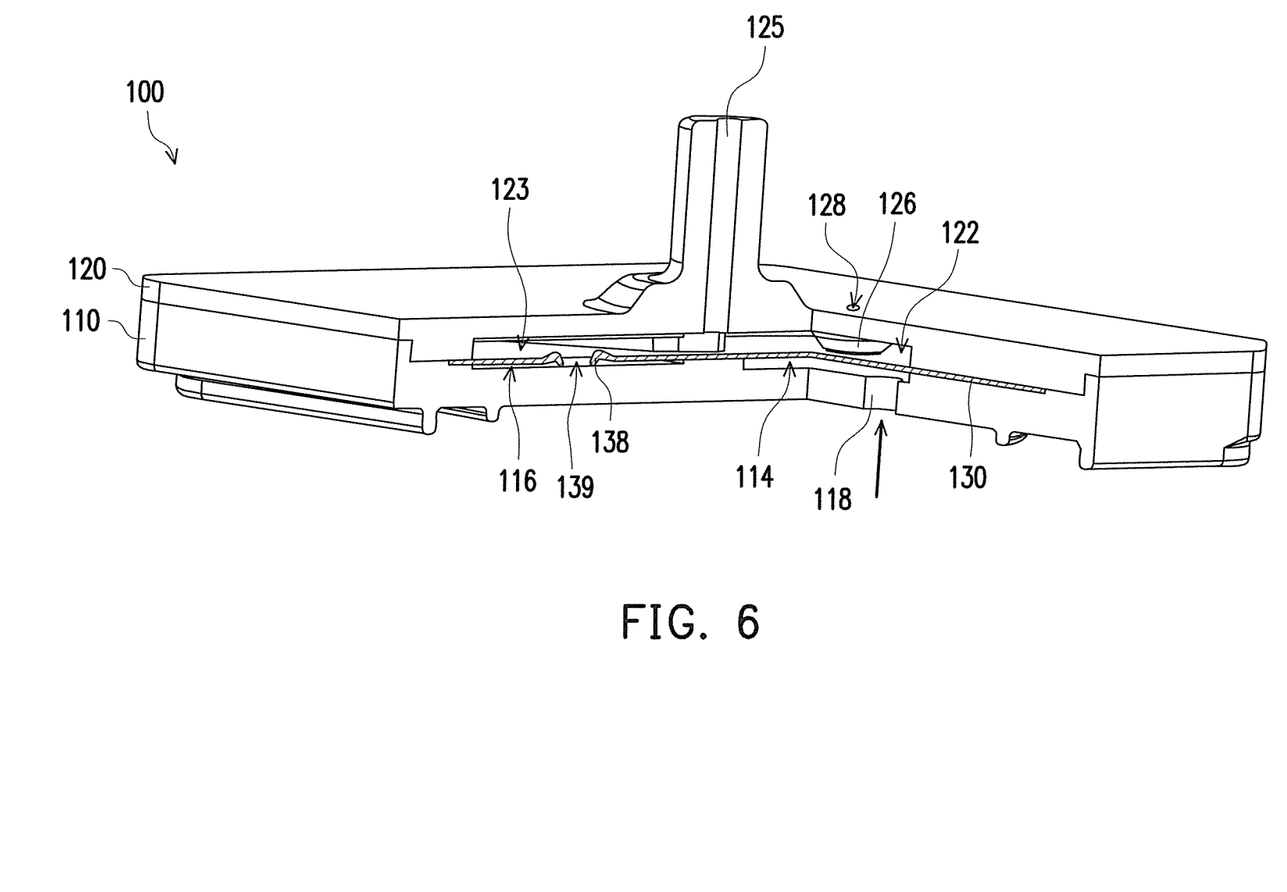
FIG. 6 is a schematic three-dimensional internal view of the one way valve assembly of FIG. 1.

Additionally, in the embodiment, the valve nozzle 138 is located at the second zone 134 of the valve member 130 and protruded from a lower surface of the valve member 130 towards the second lower hollow 116. FIG. 6 is a schematic three-dimensional internal view of the one way valve assembly of FIG. 1. Referring to FIG. 6, in the embodiment, a protrusion height of the valve nozzle 138 is larger than a depth of the second lower hollow 116. Thus, when the valve member 130 is in an initial state, the valve nozzle 138 will abut against a bottom surface of the second lower hollow 116 therebelow. A depth of the second upper hollow 123 is larger than the protrusion height of the valve nozzle 138. Thus, if the second zone 134 of the valve member 130 deforms upwards, the second upper hollow 123 provides enough space for the valve nozzle 138, such that the valve nozzle 138 would not abut against the bottom surface of the second lower hollow 116 therebelow. The valve nozzle 138 includes a valve nozzle through hole 139, so that the gas located at the second lower hollow 116 is suitable to flow from the valve nozzle through hole 139 of the valve nozzle 138 to the second upper hollow 123.

Figure 7:
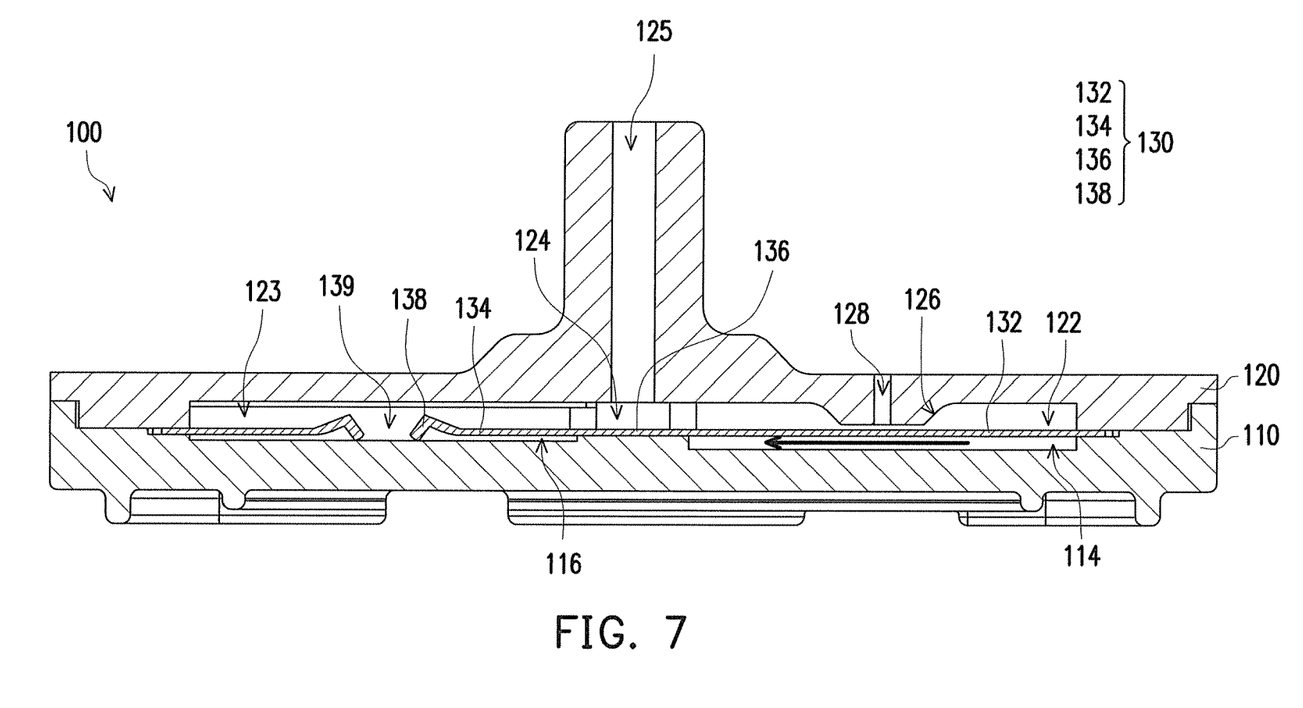
FIG. 7 to FIG. 10 are schematic cross-sectional views of actuation of the one way valve assembly of FIG. 1.

FIG. 7 to FIG. 10 are schematic cross-sectional views of actuation of the one way valve assembly of FIG. 1. Referring to FIG. 7, when the valve member 130 is in an initial state, the lower surface of the valve member 130 is attached to the base inner surface 112 tightly, such that the first zone 132 and the second zone 134 of the valve member 130 respectively cover the first lower hollow 114 and the second lower hollow 116. In this stage, an independent chamber body is formed between the first zone 132 of the valve member 130 and the first lower hollow 114, and an independent chamber body is also formed between the second zone 134 of the valve member 130 and the second lower hollow 116. That is, the first lower hollow 114 is not communicated with the second lower hollow 116. Additionally, an upper surface of the valve member 130 is attached to the cover inner surface 121 tightly. Another chamber body is formed between the first upper hollow 122, the second upper hollow 123 and the connecting path 124 which are recessed at the cover inner surface 121 and the valve member 130.

Figure 8:
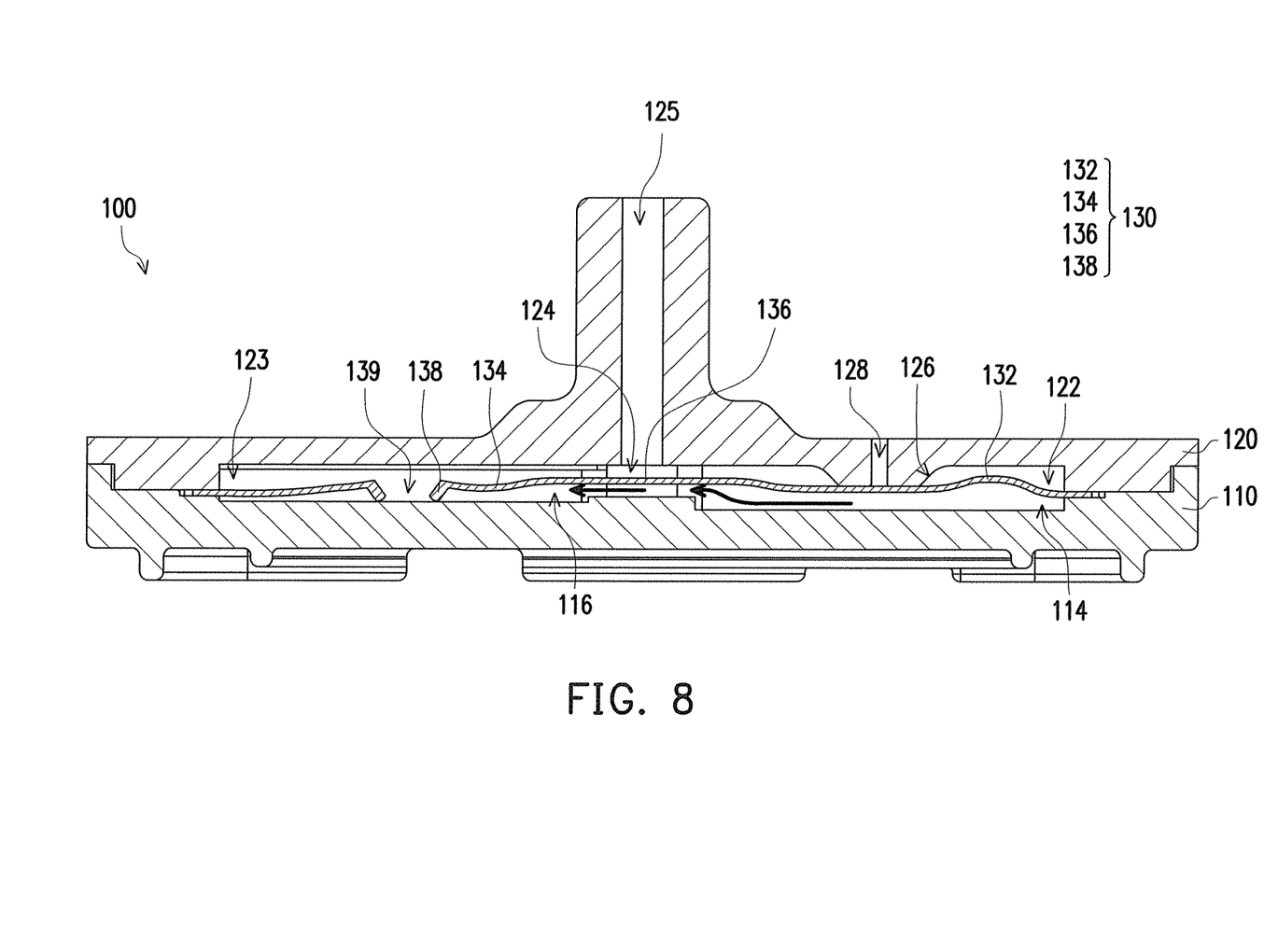

Then, referring to FIG. 8, a gas is suitable to be transferred from the inlet 118 of the base 110 to the first lower hollow 114. When there is more gas transferred to the first lower hollow 114, there is more gas pressure in the first lower hollow 114. Thus, the first zone 132 of the valve member 130 is pushed upwards, so as to deform towards the first upper hollow 122 to abut against the exhaust nozzle 126, and the gas will not be exhausted from the exhaust nozzle through hole 128 of the exhaust nozzle 126 in the subsequent outgassing process. After the first zone 132 of the valve member 130 deforms, since the connecting path 124 of the cover 120 is located next to the first upper hollow 122 and similarly recessed at the cover inner surface 121, the connecting path 124 of the cover 120 provides a space for the third zone 136 of the valve member 130 to deform. Thus, if the gas pressure in the first lower hollow 114 is increasing, the third zone 136 of the valve member 130 is pushed upwards and deforms towards the connecting path 124. At this time, the first lower hollow 114 and the second lower hollow 116 therebetween is no longer closed, and the gas can enter the second lower hollow 116 from the first lower hollow 114. In this stage, since the gas pressure in the second lower hollow 116 is not large enough to make the second zone 134 of the valve member 130 deform, the valve nozzle 138 of the valve member 130 still abuts against the bottom surface of the second lower hollow 116.

It should be mentioned that, referring back to FIG. 5, in the embodiment, shapes of the first upper hollow 122 and the second upper hollow 123 of the cover 120 are nearly circular. A width of a connection between the connecting path 124 and the second upper hollow 123 is Wo. A maximum width (that is, a diameter) of the first upper hollow 122 is D. A ratio of the width Wo of the connection between the connecting path 124 and the second upper hollow 123 to the maximum width D of the first upper hollow 122 is Wo/D. 0.03≤Wo/D≤1. The ratio range is in order to make the first zone 132 and the third zone 136 of the valve member 130 is able to deform in two stages. More specifically, since the first upper hollow 122 has a larger width, the first zone 132 of the valve member 130 is easier to deform towards the first upper hollow 122. The connecting path 124 has a smaller width, such that a larger pressure is needed that the third zone 136 of the valve member 130 is able to deform towards the connecting path 124. Thus, through the width within a specific range, the two-stage deformation that the first zone 132 of the valve member 130 deforms first and then the third zone 136 of the valve member 130 deforms can be achieved. The meaning that the first zone 132 and the third zone 136 of the valve member 130 deform in stages is that, although the exhaust nozzle 126 can be abutted against when the first zone 132 of the valve member 130 deforms in the first stage, the design that the third zone 136 needs more pressure to deform can ensure again that the valve member 130 is subjected to more pressure when deforming in the second stage. Thus, in the second stage of deformation, the first zone 132 will abut against the exhaust nozzle 126 more tightly. That is to ensure again that the exhaust nozzle 126 is in the state of stop leakage. Of course, the form of the first upper hollow 122 and the connecting path 124 of the cover 120 is not limited to FIG. 5.

Additionally, in the embodiment, a width of a connection between the connecting path 124 and the first upper hollow 122 is Wi. The width Wi of the connection between the connecting path 124 and the first upper hollow 122 is larger than the width Wo of the connection between the connecting path 124 and the second upper hollow 123. That is, Wi>Wo. Also, the width of the connecting path 124 is gradually decreased from the connection between the connecting path 124 and the first upper hollow 122 to the connection between the connecting path 124 and the second upper hollow 123. However, in other embodiments, the width Wi of the connection between the connecting path 124 and the first upper hollow 122 may be equal to the Wo of the connection between the connecting path 124 and the second upper hollow 123. That is, Wi=Wo. Also, the width of the connecting path 124 may be unchanged from the connection of the first upper hollow 122 to the connection of the second upper hollow 123. That is, the whole connecting path 124 may also have the same width. Additionally, in other embodiments, the shapes of the first upper hollow 122 and the second upper hollow 123 of the cover 120 may not be circular, as long as there is the connecting path 124 with a smaller width between the first upper hollow 122 and the second upper hollow 123 to provide the two-stage deformation for the valve member 130.

Figure 9:
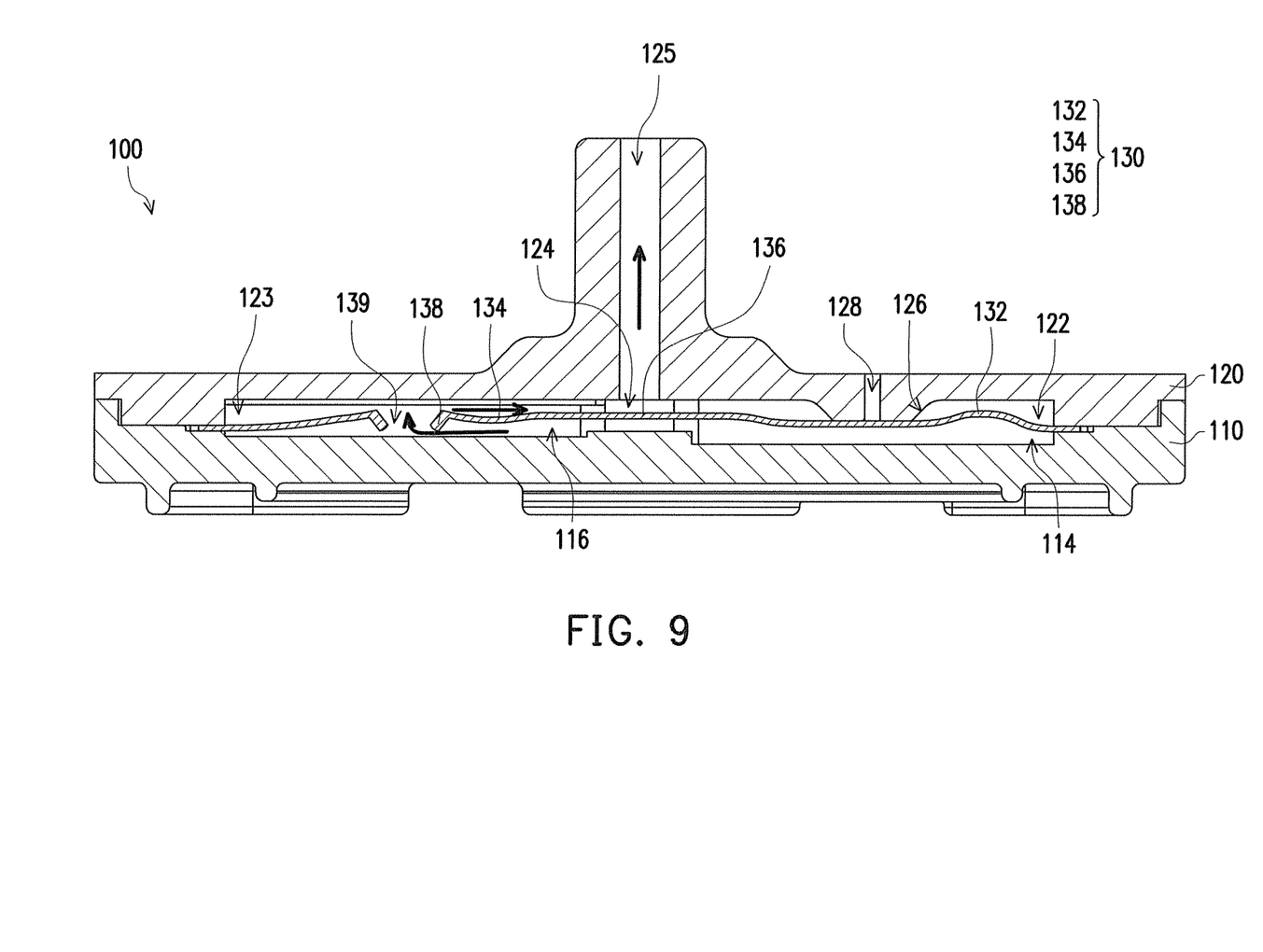

Then, referring to FIG. 9, when the inlet 118 continues air intake and the air pressure between the second lower hollow 116 and the second zone 134 of the valve member 130 is large enough, the second zone 134 of the valve member 130 will be pushed up. The valve nozzle 138 of the valve member 130 will leave the bottom surface of the second lower hollow 116. At this time, the gas located at the second lower hollow 116 will flow passing through the valve nozzle through hole 139 of the valve nozzle 138 to the second upper hollow 123. Then, the gas can flow from the second upper hollow 123 to the outlet 125 to be exhausted.

In the embodiment, to avoid that the second zone 134 of the valve member 130 abut against the top surface of the second upper hollow 123 when deforming, which may cause the gas cannot flow to the outlet 125, the cover 120 further includes a groove 127 recessed at the second upper hollow 123. The groove 127 is communicated with the outlet 125. A depth of the groove 127 is larger than a depth of the second upper hollow 123. Thus, even though the third zone 136 of the valve member 130 abuts against the top surface of the second upper hollow 123, the gas still can flow from the groove 127 to the outlet 125, and then leave the one way valve assembly 100. In the embodiment, a depth of the connecting path 124 and a depth of the first upper hollow 122 are the same as the depth of the groove 127, and the depth of the second upper hollow 123 is less than the depth of the groove 127.

It should be noted that, in the embodiment, although the outlet 125 is located at the center of the cover 120 and communicated with the connecting path 124, the valve nozzle 138 and the outlet 125 are non-collinear. The groove 127 is needed to guide the gas to the outlet 125. However, in other embodiments, the valve nozzle 138 and the outlet 125 may also be collinear. That is, the outlet 125 is directly located above the valve nozzle 138. Therefore, the design of the groove 127 may be omitted in the second upper hollow 123, and the depth of the second upper hollow 123 may also be the same as that of the first upper hollow 122 and the connecting path 124.

Additionally, in the process of air intake of the inlet 118, since the first zone 132 of the valve member 130 will move upwards in the beginning to abut against the exhaust nozzle 118, the gas will not leave from the exhaust nozzle 118 when flowing to the space between the cover 120 and the valve member 130. The gas only can leave from the outlet 125. The outlet 125 may be communicated with a closed chamber body (not shown) to be inflated, so as to pour in the gas. Of course, the object connected to the outlet 125 is not limited thereto. As described above, since the flow direction of the gas in the one way valve assembly 100 is single and fixed, the one way valve assembly 100 may have the good gas outflow efficiency.

Figure 10:
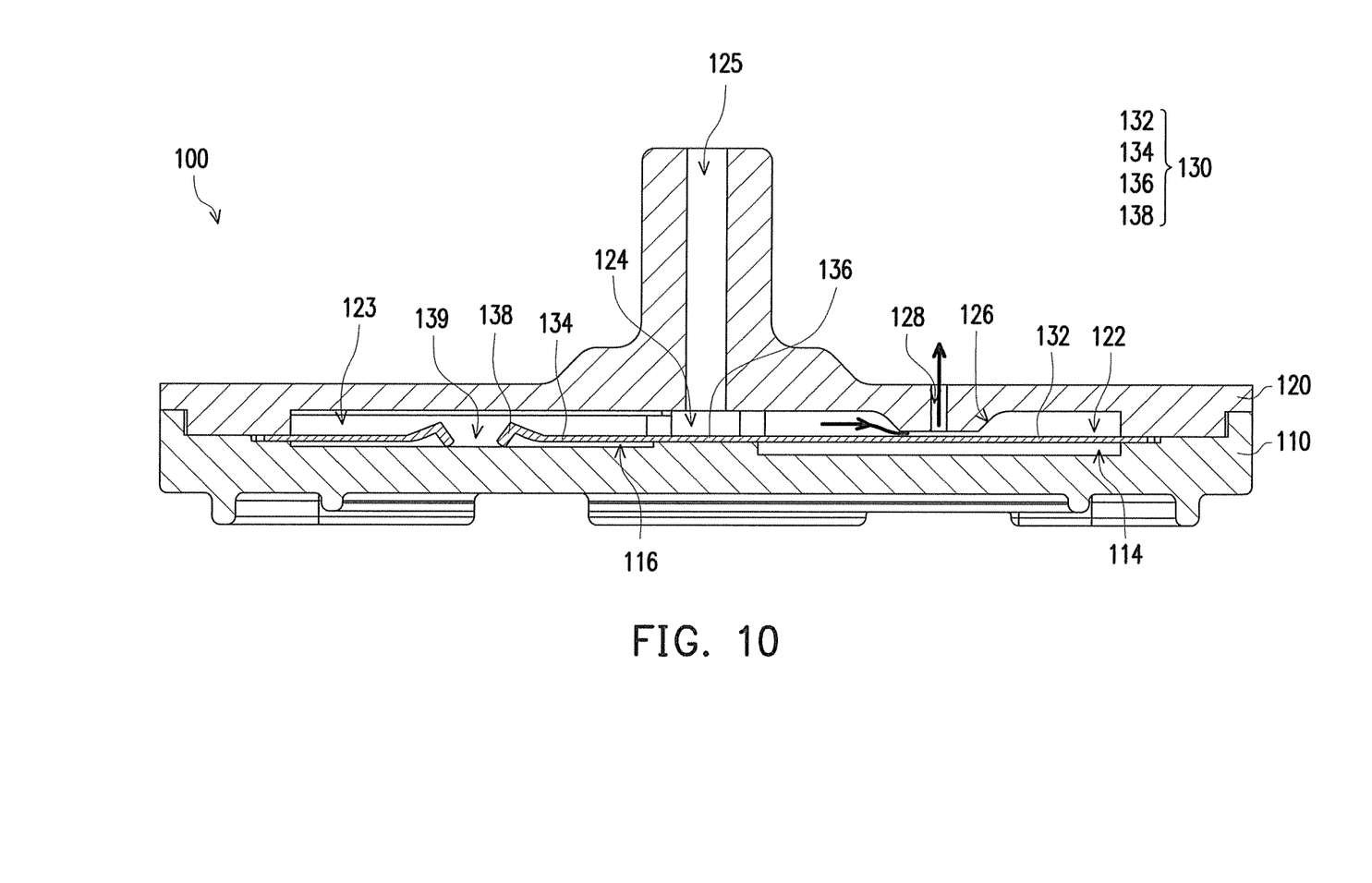

Additionally, when the one way valve assembly 100 of the embodiment is to be air exhausted, referring to FIG. 10, at this time, the gas is no longer entered from the inlet 118, and the valve member 130 is recovered to an original position. In the embodiment, the one way valve assembly 100 can be recovered to the original position in the sequence of the third zone 136, the second zone 134, and the first zone 132 of the valve member 130 in order. After the valve member 130 is recovered to the original position, the third zone 136 of the valve member 130 will be in contact with the base inner surface 112 to close the connected state between the first lower hollow 114 and the second lower hollow 116. The valve nozzle 138 of the valve member 130 will abut against the second lower hollow 116 to close the connected state between the second lower hollow 116 and the second upper hollow 123, such that the gas cannot flow back, so as to achieve the effect of double anti-reverse.

In the embodiment, a height of the exhaust nozzle 126 is slightly lower than the depth of the first upper hollow 122. As long as the first zone 132 of the valve member 130 is recovered to a flat original state, the first zone 132 of the valve member 130 will not abut against the exhaust nozzle 126, such that the gas can be exhausted from the exhaust nozzle through hole 128 of the exhaust nozzle 126. It should be noted that, in the embodiment, the outlet 125 will be connected to the closed chamber body and output the gas thereto. Thus, when the one way valve assembly 100 is no longer air intake and the valve member 130 is recovered, the gas pressure in the closed chamber body is more than the gas pressure in the chamber body between the cover 110 and the valve member 130. In other words, the gas located between the cover 110 and the valve member 130 will not leave from the outlet 125, but is exhausted from the exhaust nozzle through hole 128 of the exhaust nozzle 126. The gas in the closed chamber body flows into the chamber body between the cover 110 and the valve member 130 via the outlet 125, and then leaves through the exhaust nozzle through hole 128 of the exhaust nozzle 126.

In other embodiments, the height of the exhaust nozzle 126 may also be close to the depth of the first upper hollow 122. In this stage, since the gas is no longer entered from the inlet 118, the gas pressure located between the cover 120 and the valve member 130 may be slightly more than the gas pressure between the base 110 and the valve member 130. Thus, the first zone 132 of the valve member 130 deforms downwards (that is, towards the first lower hollow 114), and the first zone 132 of the valve member 130 does not abut against the exhaust nozzle 126. The gas located between the cover 110 and the valve member 130 can be exhausted from the exhaust nozzle through hole 128 of the exhaust nozzle 126 automatically.

Additionally, since the inlet 118 of the one way valve assembly 100 can be connected to the bump which can exhaust air, the bump can exhaust air itself when the gas is no longer provided for the inlet 118 of the one way valve assembly 100 by the bump. In other words, at this time, the bump pressure is less than the gas pressure of the first lower hollow 114 of the one way valve assembly 100. The gas originally located at the first lower hollow 114 will outflow from the inlet 118, and pressure relief occurs. When the gas pressure in the first lower hollow 114 is reduced, the pressure in the first upper hollow 122 is more than the pressure in the first lower hollow 114. The first zone 132 of the valve member 130 will deform towards the first lower hollow 114, such that the space between the first zone 132 of the valve member 130 and the exhaust nozzle 126 is increased. Thus, the gas located between the cover 110 and the valve member 130 will be exhausted from the exhaust nozzle through hole 128 of the exhaust nozzle 126 more rapidly, so as to improve the air exhaust rate.

Additionally, in the embodiment, the cover 120 is fixed to the base 110 in an airtight manner, and the intersection around the cover 120 and the base 110 is airtight. Thus, the fluid only can pass in and out via the inlet 118 and the outlet 125 of the one way valve assembly 100, and only can leave from the exhaust nozzle through hole 128 of the exhaust nozzle 126. The method of fixing the cover 120 to the base 110 may be chemical welding, thermal welding, ultrasonic welding, colloidal bonding, or a combination of a sealing ring and a screw, or a fastener, for example.

Figure 11:
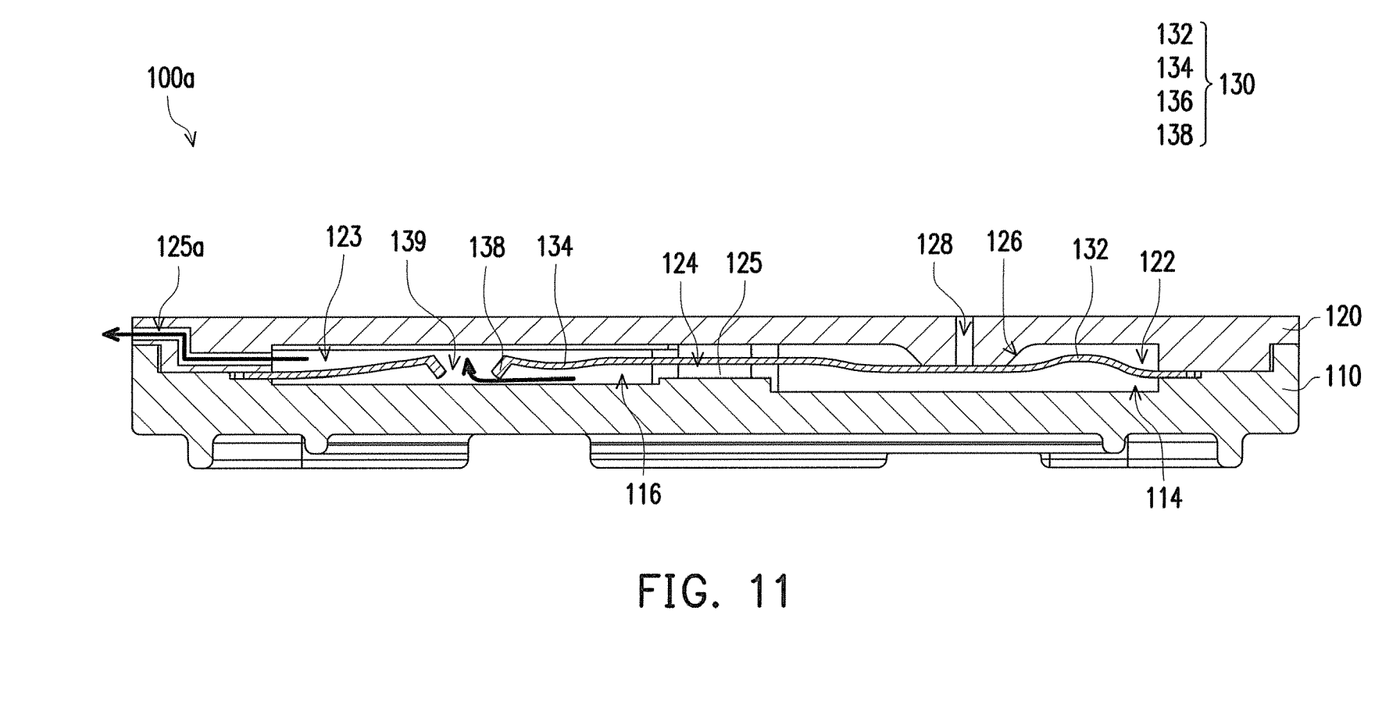
FIG. 11 is a schematic cross-sectional view of a one way valve assembly according to another embodiment of the invention.

FIG. 11 is a schematic cross-sectional view of a one way valve assembly according to another embodiment of the invention. It should be noted that, components in the embodiment the same as or similar to that of the previous embodiment are represented by the same or similar reference numbers, and are not repeated again. Only the main difference between the two are illustrated in the following.

Referring to FIG. 11, the main difference between the embodiment and the previous embodiment is that, in the previous embodiment, as shown in FIG. 7, the inlet 118 and the outlet 125 extend along the same direction (that is, the up-and-down direction of the figure). In a one way valve assembly 100a of the embodiment, the inlet 118 and an outlet 125a extend along different directions. More specifically, the one way valve assembly 100a is a side-outlet type one way valve assembly. The inlet 118 of the one way valve assembly 100a is at the bottom (extending along the up-and-down direction of the figure), and the outlet 125a is at the side surface (extending along the left-and-right direction of the figure).

In summary, the designs of the one way valve assembly of the invention are that, the positions of the first upper hollow and the second upper hollow of the cover respectively correspond to the positions of the first lower hollow and the second lower hollow of the base, the valve member is disposed between the base and the cover, the first zone, the second zone, and the third zone of the valve member are suitable to deform towards the first upper hollow, the second upper hollow, and the connecting path respectively, the exhaust nozzle is located in the first upper hollow, and the valve nozzle of the second zone abuts against the bottom surface of the second lower hollow. Thus, after the gas entering the first lower hollow from the inlet and accumulated to a certain pressure, the first zone of the valve member is pushed to deform towards the first upper hollow first so as to abut against the exhaust nozzle. Then, the third zone of the valve member is pushed to deform towards the connecting path. Thereafter, the second zone of the valve member is pushed, such that the valve nozzle leaves from the bottom surface of the second lower hollow. The gas flows through the second lower hollow, the valve nozzle, and the second upper hollow sequentially, and then is exhausted from the outlet. In other words, in the process that the gas flows from the first lower hollow to the second lower hollow, the first zone of the valve member will deform to abut against the exhaust nozzle. Additionally, when the gas is accumulated to enough pressure, the third zone of the valve member can deform. Then, the gas flows to the second lower hollow to ensure again that the first zone will abut against the exhaust nozzle tightly, so as to avoid gas exhaust of the exhaust nozzle in the outgassing process thereafter. Similarly, in the process that the gas flows from the second lower hollow to the second upper hollow, enough pressure is also needed to make the second zone of the valve member deform. Thus, the third zone and the second zone of the valve member can achieve the effect similar to a double-valve member. The deformation of the third zone can be used to ensure again that the exhaust nozzle will be forced tightly by the first zone and make the gas flow from the first lower hollow to the second lower hollow. The deformation of the second zone can make the gas flow from the second lower hollow to the second upper hollow. Additionally, after the inlet stops air intake, the valve member will be recovered. The recovered second zone can prevent the gas from flowing from the second upper hollow back to the second lower hollow, and the recovered third zone can prevent the gas from flowing from the second lower hollow back to the first lower hollow, so as to achieve the effect of double anti-reverse. Also, the recovered first zone can make the exhaust nozzle through hole open, and the gas located between the cover and the valve member can be exhausted via the exhaust nozzle automatically.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A one way valve assembly, comprising:
   a base, comprising a base inner surface, a first lower hollow and a second lower hollow which are recessed at the base inner surface, and an inlet communicated with the first lower hollow;
   a cover, comprising a cover inner surface, a first upper hollow, a second upper hollow and a connecting path which are recessed at the cover inner surface, an outlet, and an exhaust nozzle located in the first upper hollow, wherein positions of the first upper hollow and the second upper hollow respectively correspond to positions of the first lower hollow and the second lower hollow, the first upper hollow is communicated with the second upper hollow via the connecting path, and the outlet is communicated with the second upper hollow; and
   a valve member, disposed between the base and the cover, the valve member having a first zone, a second zone, and a third zone corresponding to the first upper hollow, the second upper hollow, and the connecting path, and comprising a valve nozzle located between the second lower hollow and the second upper hollow, wherein the first zone is suitable to deform towards the first lower hollow or the first upper hollow, the second zone is suitable to deform towards the second upper hollow, and the third zone is suitable to deform towards the connecting path, wherein:
   in an initial state, the valve member is suitable to seal the first lower hollow and the second lower hollow, after a gas enters the first lower hollow from the inlet, the first zone of the valve member is pushed by the gas to deform towards the first upper hollow so as to abut against the exhaust nozzle, then the third zone of the valve member is pushed by the gas to deform towards the connecting path, and then the second zone of the valve member is pushed by the gas to deform towards the second upper hollow, such that the gas flows from the first lower hollow through the second lower hollow, the valve nozzle, and the second upper hollow sequentially, and then is exhausted from the outlet,
   in an exhaust state, the valve member is recovered to close a connected state between the first lower hollow and the second lower hollow and a connected state between the second lower hollow and the second upper hollow, and the gas located between the cover and the valve member leaves from the one way valve assembly from the exhaust nozzle automatically, and
   wherein a width of a connection between the connecting path and the first upper hollow is Wi, a width of a connection between the connecting path and the second upper hollow is Wo, and Wi≥Wo.

2. The one way valve assembly according to claim 1, wherein a maximum width of the first upper hollow is D, and 0.03≤Wo/D≤1.

3. The one way valve assembly according to claim 1, wherein a width of the connecting path is gradually decreased or unchanged from a connection between the connecting path and the first upper hollow to a connection between the connecting path and the second upper hollow.

4. The one way valve assembly according to claim 1, wherein the valve nozzle is located at the second zone of the valve member and protruded towards the second lower hollow, a depth of the second upper hollow is larger than a protrusion height of the valve nozzle, and the protrusion height of the valve nozzle is larger than a depth of the second lower hollow.

5. The one way valve assembly according to claim 1, wherein the cover further comprises a groove recessed at the second upper hollow, the groove being communicated with the outlet.

6. The one way valve assembly according to claim 1, wherein the inlet and the outlet extend along a same direction.

7. The one way valve assembly according to claim 1, wherein the valve nozzle and the outlet are collinear.

8. The one way valve assembly according to claim 1, wherein the cover is fixed to the base in an airtight manner.

9. The one way valve assembly according to claim 1, wherein the inlet and the outlet extend along different directions.

10. The one way valve assembly according to claim 1, wherein the valve nozzle and the outlet are non-collinear.

* * * * *